United States Patent [19]
Miller et al.

[11] 3,838,334
[45] Sept. 24, 1974

[54] ELECTRICAL DEVICE WITH TWO-TERMINAL BUSHING

[75] Inventors: Gene L. Miller; James J. McNally; Robert D. McClain, all of Bloomington, Ind.

[73] Assignee: Westinghouse Electric Corportion, Pittsburgh, Pa.

[22] Filed: Mar. 29, 1971

[21] Appl. No.: 128,730

[52] U.S. Cl. ............... 323/93, 174/145, 174/152 R
[51] Int. Cl. .......................................... H01b 17/26
[58] Field of Search........ 174/18, 31 R, 50.55, 50.6, 174/142, 143, 145, 151, 152 R, 153 R, 167; 317/242; 323/93

[56] References Cited
UNITED STATES PATENTS

| 1,657,249 | 1/1928 | Eby | 174/142 X |
| 1,957,982 | 5/1934 | Smith | 174/142 X |
| 1,957,986 | 5/1934 | Smith | 174/18 |
| 2,144,558 | 1/1939 | Bahls | 174/151 |
| 2,278,974 | 4/1942 | Christensen | 174/152 R |
| 2,411,656 | 11/1946 | Henderson et al. | 174/152 R X |

FOREIGN PATENTS OR APPLICATIONS

| 1,065,095 | 9/1959 | Germany | 174/142 |
| 1,167,410 | 4/1964 | Germany | 174/18 |

*Primary Examiner*—Laramie E. Askin
*Attorney, Agent, or Firm*—G. H. Telfer

[57] ABSTRACT

An electrical device having a sealed casing with at least one two-terminal bushing in which two leads are brought out through a single bushing to separate isolated terminal devices. The invention is particularly suitable for three-phase capacitor units with an isolated neutral terminal.

7 Claims, 2 Drawing Figures

PATENTED SEP 24 1974

3,838,334

INVENTORS
Gene L. Miller, James J. McNally
and Robert D. McClain.
BY
ATTORNEY

ELECTRICAL DEVICE WITH TWO-TERMINAL BUSHING

BACKGROUND OF THE INVENTION

The present invention relates to electrical devices contained in a sealed housing or casing with leads brought out through terminal bushings for external connection. The invention is particularly suitable for three-phase capacitors with isolated neutral leads, although it is not limited to this particular application and may also be used in other types of electrical devices. Power capacitors consist of the necessary number of individual capacitor sections contained in a metal casing which is sealed to prevent the entrance of moisture, and terminal leads are brought out through insulating terminal bushings sealed in the cover of the casing. The capacitor sections may be connected internally of the casing in any desired circuit configuration which determines the necessary number of terminal bushings. In particular a three-phase connection of the capacitor elements usually requires at least three terminal bushings. In many cases three-phase capacitors are connected internally in delta or in wye with the neutral point grounded to the casing. In either of these instances only three terminal bushings are required. There are also many cases, however, where it is desired to provide wye-connected three-phase capacitor units with an isolated neutral connection, to enable the neutral point to be grounded otherwise than through the capacitor casing, or to be connected by an isolated neutral wire to other capacitor units or to other equipment. In such cases four terminal bushings would be needed on the cover of the casing. Usually, however, the space available within the standard dimensions of power capacitors is such that three bushings can readily be accommodated in the cover of the casing but there is not sufficient room for four bushings unless they are placed so close together that the clearance spacing between the terminals is reduced to an unsafe distance. Thus, threephase capacitors with an isolated neutral terminal have not been available, except in low voltage units where the clearance between terminals can safely be reduced.

SUMMARY OF THE INVENTION

In accordance with the present invention a three-phase wye-connected capacitor unit is provided with an isolated neutral terminal. This result is obtained by means of a two-terminal bushing through which two leads can be brought out to terminals which are electrically isolated from each other. More particularly, a bushing is provided which comprises two bushing members axially aligned and longitudinally spaced from each other with connecting means rigidly joining them together mechanically and enclosing the space between them. One of the bushing members is mounted in the cover of the sealed casing so that the axially aligned second bushing member is, in effect, on top of the first one. A terminal device is provided on the connecting means between the two bushing members and another terminal device is provided on top of the second or upper bushing member in the usual manner. Two terminal leads are brought through the first or lower bushing member with one of the leads connected to each of the two terminal devices, and two electrically isolated terminals are thus provided. Such a two-terminal bushing with two conventional bushings, or two two-terminal bushings, can be used on the casing to bring out four isolated leads so that a three-phase capacitor with isolated neutral terminal can readily be provided. The two-terminal bushing is of course suitable for numerous other uses and its application is not limited to the use on capacitors as described herein.

BRIEF DESCRIPTION OF DRAWINGS

The invention will be more fully understood from the following detailed description of an illustrative embodiment, taken in connection with the accompanying drawings, in which.

DESCRIPTION OF PREFERRED EMBODIMENT

Figure 2:
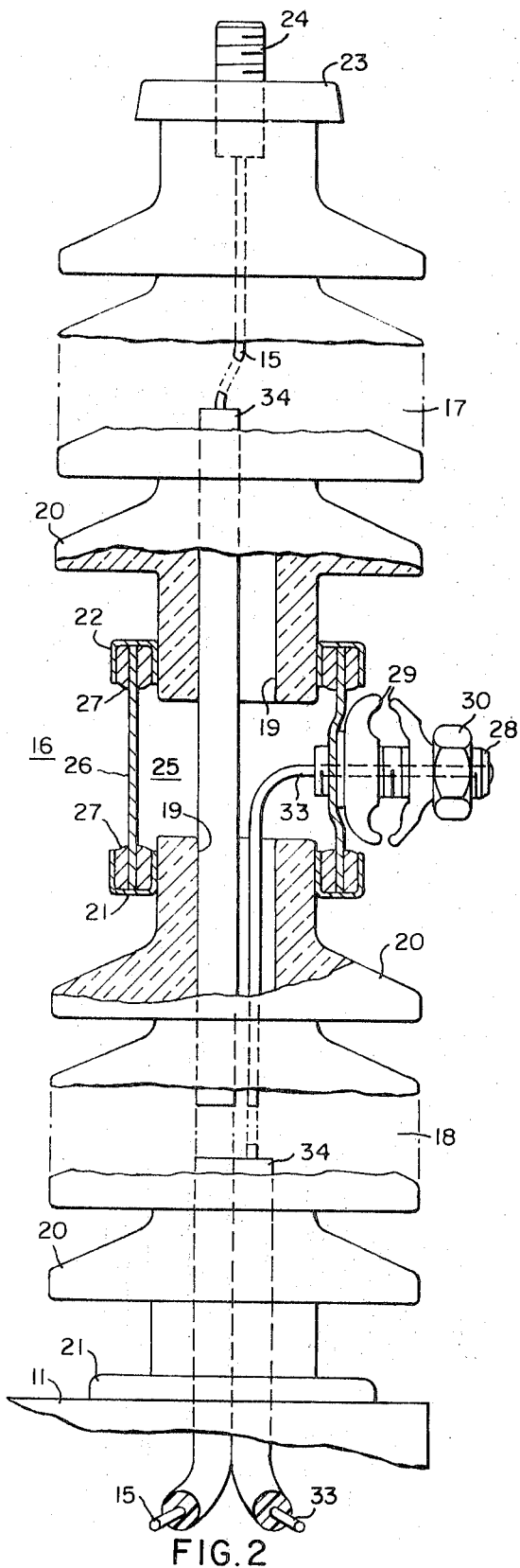
FIG. 2 is a view on a larger scale and partly in section showing a two-terminal bushing.

The invention is shown in the drawing embodied in a power capacitor 10 which may be of any suitable or usual construction. The capacitor 10 comprises a sealed metal casing or housing 11 of any desired construction and which may be provided with the usual mounting brackets 12. The capacitor elements 13 may be of any suitable type and are contained within the casing 11. The capacitor elements 13 preferably consist of a suitable number of capacitor sections each consisting of interleaved metal foil and dielectric material formed into rolled and flattened sections and impregnated with a suitable liquid impregnant which substantially fills the casing. The capacitor elements may be of any suitable type and have not been illustrated or described in detail since they are not a part of the invention. As shown diagrammatically in FIG. 1, the capacitor elements 13 are connected within the casing 11 in a three-phase wye configuration with a neutral point 14.

As previously explained, in some cases the neutral point 14 can be grounded to the metal casing 11 and in such cases the three leads 15 from the three phases of the capacitor assembly can be brought out through three conventional terminal bushings. In many cases, however, an isolated terminal for the neutral point 14 is also required and in such cases there is usually insufficient room on the top of the casing 11 for a fourth terminal bushing. In accordance with the present invention, such an isolated neutral terminal can be provided by means of the two-terminal bushing 16.

As shown in FIG. 2, the bushing 16 includes two bushing members 17 and 18 of porcelain or other suitable insulating material. Each of the bushing members 17 and 18 is a tubular member having a central bore 19 and the necessary number of skirts 20 on the outside. The bushing member 18 has a metal ring 21 of U-shaped cross section attached at both top and bottom of the bushing. The rings 21 may be soldered to a metallic glaze on the surface of the porcelain or may be securely attached and sealed to the bushing member in any other desired manner. A similar metal ring 22 is attached in a similar manner to the lower end of the bushing member 17 and a conventional metal cap 23 and terminal stud 24 are attached and sealed to the other end of the bushing member 17.

The two bushing members 17 and 18 are disposed in axial alignment, as shown in FIG. 2, with the bushing member 17 vertically above the bushing member 18 in the illustrated embodiment, and the bushing members are longitudinally spaced apart to provide a space 25 between them. The bushing members 17 and 18 are rigidly connected together by a connecting member which is shown as a metal tube 26 and which may be made of brass or other suitable rigid material of sufficient mechanical strength. The ends of the tube 26 are received in the ring 21 at the top of the bushing member 18 and in the ring 22 at the bottom of the bushing member 17 and are soldered in the respective rings, as indicated at 27, to form rigid mechanical joints which also seal the enclosed space 25 between the two bushing members. A terminal stud 28 is mounted on the tube 26 at one side in sealing and electrically conductive engagement and if desired clamps 29 and a terminal nut 30 may also be provided. Similar clamps and terminal nut may of course be provided on the upper stud 24.

Figure 1:
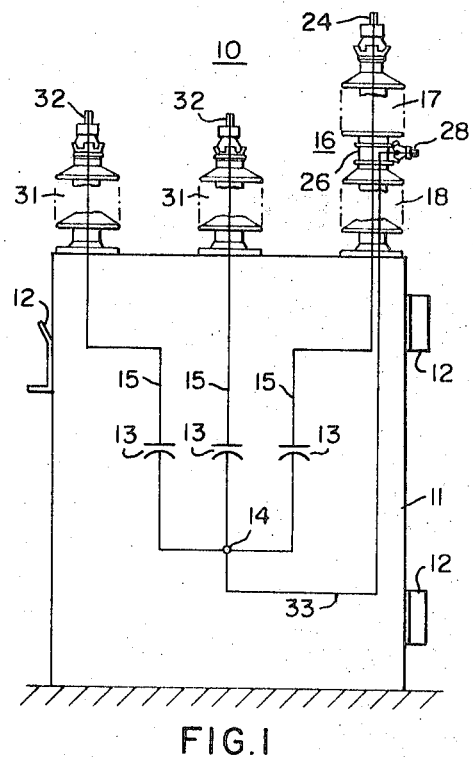
FIG. 1 is a view in elevation of a typical capacitor unit embodying the invention.

The bushing member 16 is mounted on the top of the capacitor casing 11 as shown in FIG. 1. That is, the ring 21 at the lower end of the busing member 18 is soldered or otherwise secured in the top of the casing in the usual manner, or in any desired manner which forms a mechanically strong sealed connection. Two conventional terminal bushings 31, which may each be generally similar to either of the bushing members 17 and 18, are also mounted and sealed in the top of the casing 11 in the usual manner. Leads 15 from two of the phase legs of the capacitor assembly are brought out through the bushings 31 to conventional terminals 32 in the usual manner. The lead 15 from the third phase leg of the capacitor assembly and a lead 33 from the neutral point 14 are brought through the bore 19 of the terminal bushing member 18. The lead 33 from the neutral point 14 is attached to the terminal stud 28 while the lead 15 from the third phase leg is carried on up through the bushing member 17 to the terminal stud 24 to which it is attached. Suitable insulating sleeves or tubing 34 may be provided within the terminal bushing members to insulate the leads 15 and 33 from each other. The connections of the leads could of course be reversed if desired. That is, the neutral lead 33 could be connected to the top terminal 24 and the phase lead 15 could be connected to the terminal 28.

It will be seen that a two-terminal bushing member 16 is thus provided through which two leads may be brought out from the interior of the casing 11 and separately connected to electrically isolated terminal members. This arrangement makes it possible to provide four isolated terminals in the space required for three conventional bushings, and three-phase capacitors can thus be provided with an isolated neutral terminal in a simple manner and without any sacrifice of the necessary clearance space between terminals of different phases. The construction is such that the two-terminal bushing device is completely sealed so that it can be used on capacitors or other sealed devices and it can readily be made of essentially standard parts, since the individual bushing members 17 and 18 themselves may be similar to conventional single-terminal bushings, and they are joined in a simple manner by a metal tube soldered in place, although any other suitable rigid connecting and sealing means might be used if desired.

It will now be apparent that a construction has been provided for three-phase capacitors which makes it possible to provide an isolated neutral terminal in a simple and effective manner. It will be understood, however, that the invention is not limited to this particular application but that the two-terminal bushing disclosed may be utilized equally well in other types of electrical devices where it is desired to bring two leads out of an enclosed casing to isolated terminal members through a single bushing. It will be understood therefore that although a particular embodiment of the invention has been shown and described for the purpose of illustration the invention is not so limited but includes all equivalent embodiments and modifications.

We claim as our invention:

1. In an electrical device having a casing, a two terminal bushing device mounted on the casing, said bushing device comprising first and second bushing members, said bushing members having substantially identical tubular insulating bushings, the first bushing member having securing means at each end thereof, the second bushing member having securing means at one end thereof and first terminal means closing and sealing the other end, the first bushing member being secured at one end to said casing, the second bushing member being disposed in axial alignment with the first bushing member and longitudinally spaced therefrom, said terminal means being at the end of the second bushing member remote from the first bushing member, connecting means extending between the two bushing members and enclosing the space between them, said connecting means being secured to the securing means at the adjacent ends of the bushing members and sealed thereto, and second terminal means mounted on the connecting means.

2. The combination of claim 1 in which the connecting means comprises a tubular metal member rigidly attached to the adjacent ends of the two bushing members and enclosing the space therebetween.

3. The combination of claim 1 and including two leads extending side by side from the casing through the first bushing member, one of said leads being connected to said second terminal means and the other of said leads extending through the second bushing member and being connected to the first terminal means, said two leads being insulated from each other.

4. A capacitor having a sealed casing, a plurality of capacitor elements in the casing, a plurality of terminal bushings on the casing, leads connected to the capacitor elements and extending through the bushings, at least one of said bushings comprising first and second bushing members, said bushing members having substantially identical tubular insulating bushings, the first bushing member having securing means at each end thereof, the second bushing member having securing means at one end thereof and first terminal means closing and sealing the other end, said bushing members being disposed in axial alignment and longitudinally spaced apart, connecting means engaging the securing means at one end of each bushing member in sealing relation to enclose and seal the space between the bushing members, said first terminal means being at the end of the second bushing member remote from the first bushing member, second terminal means on the connecting means, the first bushing member being secured to said casing and sealed thereto, and two of said leads extending through said first bushing member and being connected to said first and second terminal means respectively.

5. A capacitor as defined in claim 4 in which the connecting means comprises a metal tube rigidly attached and sealed to the adjacent ends of the two bushing members, said tube enclosing the space between the bushing members, and the second terminal means being mounted on said tube.

6. A capacitor as defined in claim 4 in which two leads extend from the casing through the first bushing member, said leads being insulated from each other, one of said leads being connected to the second terminal means, and the other of said leads extending through the second bushing member and being connected to the first terminal means.

7. A capacitor as defined in claim 6 in which the capacitor elements are connected together in wye and the lead connected to the first terminal means is a phase lead while the lead connected to the second terminal means is connected to the neutral point of the wye.

* * * * *